(No Model.) 2 Sheets—Sheet 1.

F. C. BOYNTON.
Automatic Feeder for Middlings Purifiers, &c.

No. 234,747. Patented Nov. 23, 1880.

Witnesses:
F. Walter Fowler
H. H. Morsell

Inventor:
Fred. C. Boynton
per Atty
A. H. Evans & Co

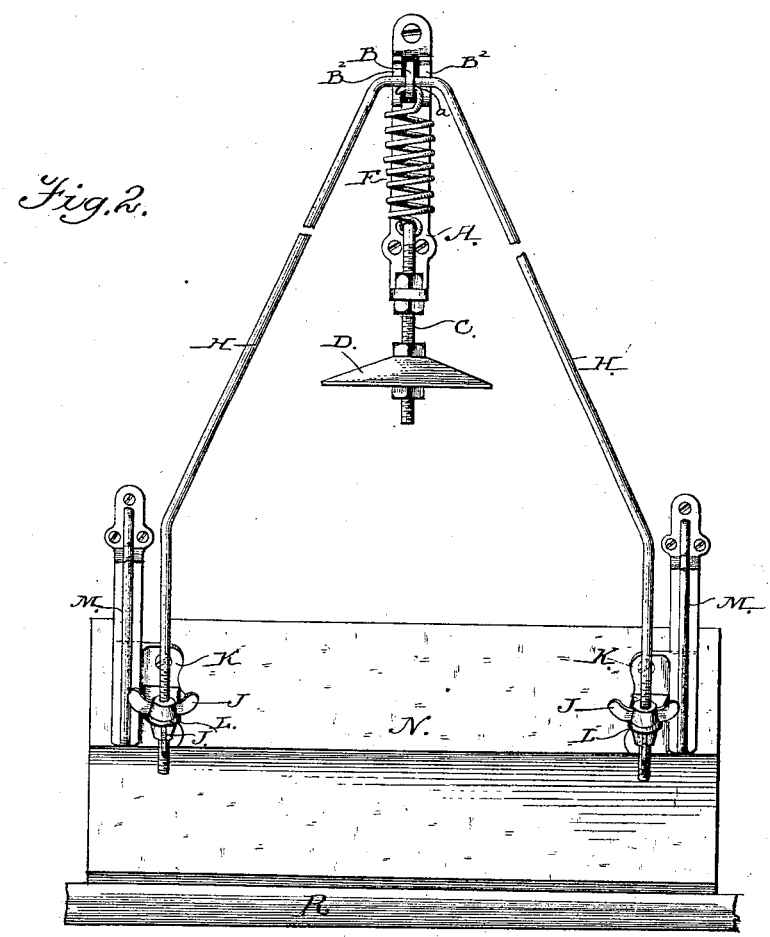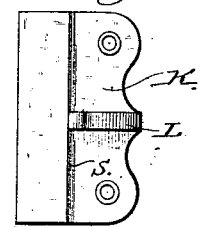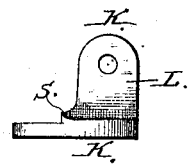

UNITED STATES PATENT OFFICE.

FRED. C. BOYNTON, OF RED WING, MINNESOTA.

AUTOMATIC FEEDER FOR MIDDLINGS-PURIFIERS, &c.

SPECIFICATION forming part of Letters Patent No. 234,747, dated November 23, 1880.

Application filed August 11, 1880. (No model.)

*To all whom it may concern:*

Be it known that I, FRED. C. BOYNTON, of Red Wing, county of Goodhue, and State of Minnesota, have invented an Automatic Feeder, for the Purpose of Feeding Middlings-Purifiers, Smutters, Crushers, and other like machines, where the regulation of the feed is an essential object, and of which the following is a clear, full, and exact description, reference being had to the accompanying drawings, making a part of this specification, in which—

Figure 1:
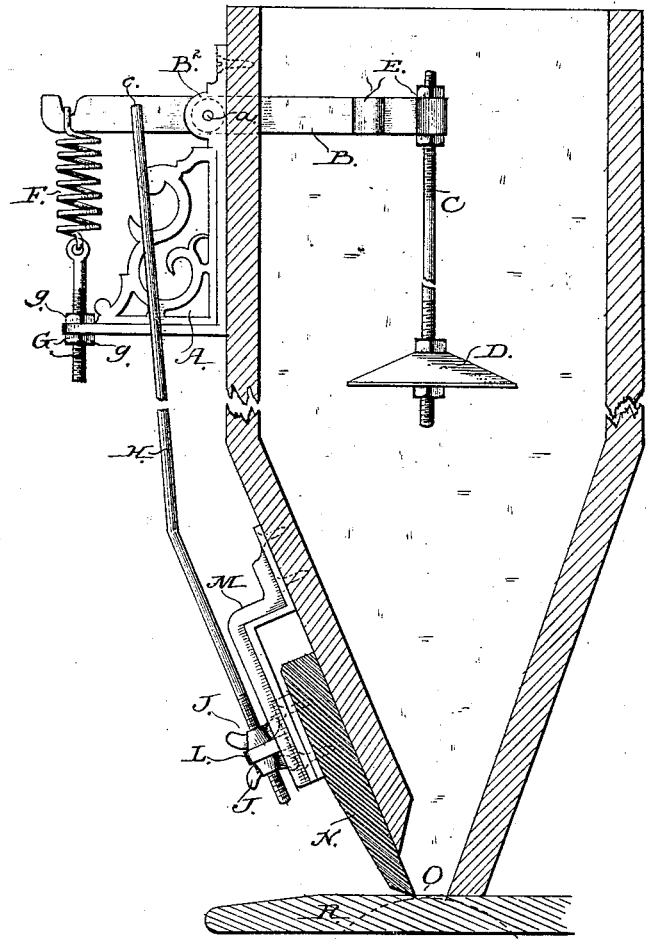
Figure 5:
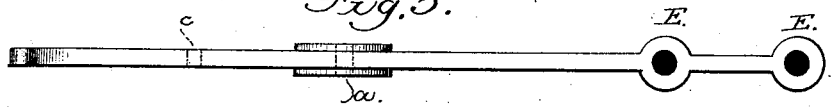

Figure 1 is a sectional elevation of a hopper with the device attached, showing the relative position and size of different parts. Fig. 2 is a front view, showing the manner of making connections with the feed-slide. Fig. 3 is a front view of the guide-plate, by which connection is made with the feed-slide, to which it is attached. Fig. 4 is an end view of the same, and shows more fully its form. Fig. 5 is a top view of the lever.

To enable others skilled in the art to make and use my invention, I will proceed to describe the exact manner in which I have carried it out.

In the drawings, A represents an inverted bracket, having near its upper extremity two lugs projecting therefrom, as shown at $B^2$. Between these two lugs and passing through the bracket is a slotted opening, through which passes the lever B, which is pivoted at *a*.

From the inner end of lever B is suspended, by means of rod C, the conical-shaped float D. The distance of float D from lever B is adjusted by means of threaded nuts on rod C, above and below lever B and float D.

The inner end of lever B may be provided with two or more places for the reception of rod C, as shown at E.

At the outer end of lever B is attached a close-coil spring, F, the tension of which is regulated by means of tension-screw G, which passes through the lower projection of bracket A and is secured by stay-nuts *g*.

At *c* are secured small rods H to lever B, which, extending downward and outward, from a perpendicular line, pass through lugs L on the front guide-plates, K, and which are adjusted by means of threaded thumb-nuts J. The form of the guide-plates is fully shown in Figs. 3 and 4, in which L is the lug and S is the shoulder, which, in connection with the guide M, Figs. 1 and 2, serves as a guide for the feed-slide N, to which it is attached.

The attachment M is secured to the front of the hopper just above the feed-slide N, and this attachment also serves as a rest for the slide.

The rods H and feed-slide N may be of any required length.

R, Figs. 1 and 2, represents the ordinary spreading-board or revolving roll, as the case may be.

O is the opening through which the material flows.

The lever B is provided with circular bosses on each side at the place where it is pivoted, *a*, in order to give the pivot greater bearing and prevent any lateral motion or canting of the lever.

Having thus described the different parts and general arrangement of my invention, I will proceed to describe its manner of working.

The feed-slide N being closed, a slight strain is put on the coil-spring F, when the middlings or other material is let in above the float D and allowed to accumulate until the float is well submerged. The feed-slide is then slightly raised, by means of the thumb-nuts J, so that the material is allowed to flow through the opening O, thereby releasing the material which has accumulated under the float D. The pressure of the material above the float then balances the lever B in opposition to the spring F, thus opening or closing the feed-slide N by means of rod H, according to the increase or decrease of pressure on float D. The amount of material to be retained in the hopper is regulated by the tension of spring F.

I am aware that floats within the hopper for automatic feeders are not new, nor is it new to suspend such floats upon a lever for working the feed-slide. I therefore do not claim such devices, broadly.

What I claim as new, and desire to secure by Letters Patent, is—

1. In an automatic feeder, the inverted bracket A, supporting the lever B and adjustable coil-spring F, in combination with the coil-spring F, adjustable cone-shaped float D, adapted to vary its position with the varying quantity of material beneath the float, the lever B, and bent rods H, all constructed to operate substantially as herein shown and described.

2. The bent rods and adjustable coil-spring F, secured to the outer end of the lever B, guide-plates K, guides M, and feed-slide N, in combination with the lever B, provided with the adjustable cone-shaped float D, all constructed substantially as herein shown and described.

FRED. C. BOYNTON.

Attest:
BENJ. B. HERBERT,
W. E. ARNOLD.